US012280472B2

(12) United States Patent
O'Brien et al.

(10) Patent No.: US 12,280,472 B2
(45) Date of Patent: Apr. 22, 2025

(54) TOOLS

(71) Applicant: Atlas Copco Industrial Technique AB, Nacka (SE)

(72) Inventors: Ian O'Brien, Cramlington (GB); Joseph Gill, Cramlington (GB); Tony Dodds, Cramlington (GB); Teresa O'Brien, Cramlington (GB)

(73) Assignee: Atlas Copco Industrial Technique AB, Nacka (SE)

( * ) Notice: Subject to any disclaimer, the term of this patent is extended or adjusted under 35 U.S.C. 154(b) by 375 days.

(21) Appl. No.: 17/928,053

(22) PCT Filed: May 28, 2021

(86) PCT No.: PCT/IB2021/054678

§ 371 (c)(1),
(2) Date: Nov. 28, 2022

(87) PCT Pub. No.: WO2021/240451

PCT Pub. Date: Dec. 2, 2021

(65) Prior Publication Data

US 2023/0211478 A1 Jul. 6, 2023

(30) Foreign Application Priority Data

May 28, 2020 (GB) ..................................... 2008035

(51) Int. Cl.
*B25B 21/00* (2006.01)
*B25B 23/00* (2006.01)

(52) U.S. Cl.
CPC ........ *B25B 21/005* (2013.01); *B25B 23/0007* (2013.01)

(58) Field of Classification Search
CPC .............. B25B 21/005; B25B 23/0007; B25B 23/0078; B25B 23/0085
See application file for complete search history.

(56) References Cited

U.S. PATENT DOCUMENTS 4,385,533 A * 5/1983 Collins ............... B25B 23/0078 81/57.39
5,103,696 A 4/1992 Beuke
(Continued)

FOREIGN PATENT DOCUMENTS

CN 203726402 U 7/2014
CN 206484473 U 9/2017
(Continued)

OTHER PUBLICATIONS

International Search Report and Written Opinion pertaining to Application No. PCT/IB2021/054678 dated Aug. 31, 2021, 14 pages.
(Continued)

*Primary Examiner* — David B. Thomas
(74) *Attorney, Agent, or Firm* — Dinsmore & Shohl LLP

(57) ABSTRACT

An engagement part of a tool such as a hydraulic wrench (10), the engagement part (1) such as a ratchet link being arranged to engage a workpiece and a power head (11), the engagement part (1) being arranged to convert movement generated by the power head (11) into movement of the workpiece, the engagement part (1) comprising a mounting for the power head (4, 14), the mounting (4, 14) comprising a moveable portion moveable (4) from a first position where the power head (11) is fixed relative to the engagement part (1) and a second position where the power head (11) can move relative to the engagement part (1), the moveable portion (4) comprising a pin having a length and slidable along its length in a bore (17) in the engagement part (1) and a friction lock (2, 3) comprising a compressible member (3) and a compressing member (2) arranged to compress the compressible member (3), the compressible member (3) being arranged such that it expands in at least one extent on compression by the compressing member (2) such that in a locked position of the friction lock the compressible member
(Continued)

(3) extends so as contact the pin (4) so as to restrict movement of the pin (4).

15 Claims, 4 Drawing Sheets

(56) References Cited

U.S. PATENT DOCUMENTS

| | | | | |
|---|---|---|---|---|
| 5,201,256 | A * | 4/1993 | Schneider | B25B 13/488<br>81/57.39 |
| 9,492,912 | B2 | 11/2016 | Spirer | |
| 2002/0121161 | A1 | 9/2002 | Koppenhoefer | |
| 2018/0178356 | A1 * | 6/2018 | Hohmann | B25B 23/0078 |

FOREIGN PATENT DOCUMENTS

| | | | |
|---|---|---|---|
| GB | 2573169 | A | 10/2019 |
| JP | H03117567 | A | 5/1991 |

OTHER PUBLICATIONS

Search Report pertaining to Application No. GB2008035.4 dated Nov. 19, 2020, 1 page.

* cited by examiner

TOOLS

This invention relates to tools, particularly engagement parts of tools such as, non-exclusively, hydraulic wrenches.

Hydraulic wrenches are well known in the prior art. Atlas Copco provide an RTX hexagon drive hydraulic wrench, as do other suppliers, which comprise a releasable power head that can engage a ratchet link which itself engages the workpiece (typically a hex nut or hex head of a bolt or the like). The power head provides motion derived from hydraulic power, and the ratchet link converts that motion into rotation of the workpiece.

In order to change the power head/ratchet head combination, a releasable mounting of some description can be used. Typically, that may comprise a fixed part (e.g. a fixed pin working in a slot) and a releasable part (such a releasable pin working in a bore, removal of the pin allowing release of the two parts).

However, retaining such releasable parts, and pins in particular, can be troublesome. Pins may fall out, causing separation of the power head and ratchet link causing tool failure, and also potentially representing a drop hazard.

One proposal such as has been used with our RTX hydraulic wrenches is to provide a circumferential groove on the pin and provide a spring-loaded ball—a detent—in the bore. This will retain the pin. However, it is desired to improve the security with which the pin is retained as compared to such methods.

According to a first aspect of the invention, we provide an engagement part of a tool, the engagement part being arranged to engage a workpiece and a power head, the engagement part being arranged to convert movement generated by the power head into movement of the workpiece, the engagement part comprising a mounting for the power head, the mounting comprising a moveable portion moveable from a first position where the power head is fixed relative to the engagement part and a second position where the power head can move relative to the engagement part, the moveable portion comprising a pin having a length and slidable along its length in a bore in the engagement part and a friction lock comprising a compressible member and a compressing member arranged to compress the compressible member, the compressible member being arranged such that it expands in at least one extent on compression by the compressing member such that in a locked position of the friction lock, the compressible member extends so as contact the pin so as to restrict movement of the pin.

As such, this provides for a pin that is positively retained in place by a frictional engagement of a compressible member that is urged into place by the action of a user. As such, it is less likely that the pin will unintentionally fall out of the engagement part than solely relying on, for example, a spring-biased ball bearing working in a groove in the pin. The pin may be sized and shaped so as to pass through a part of the power head.

The pin may have a consistent cross section over a portion of its length, the portion typically being a majority of the length. The cross section may be non-circular.

Typically, the cross section would have a circumference and would comprise a first shape over a first portion of the circumference and a second shape over a second portion of the circumference. Typically, the first and second shapes would be non-concentric circular arcs, with a centre of the arc forming the second shape being outside of the cross section. As such, this describes a generally cylindrical pin with a crescent-shaped key taken out and is easy to machine.

The portion of the length may not extend to a retained end of the pin, which is held captive in the bore by at least the compressible member, if not also the compression member. The retained end may have a cross section of the first shape. The compressible member may be arranged to engage the pin at the second portion of the circumference. The compressible member may have an outer circumference complementary to the second shape; as such, the compressible member may be circular, and may have a variable radius depending on a degree of compression applied to the compressible member by the compression member, with the compressible member typically frictionally engaging the pin over the second shape in the locked position.

As such, the compressible member may comprise a compressible washer, and the compression member may comprise a threaded stud and a head, the head providing a flange which bears onto the compressible washer. The threaded stud be mounted in a threaded bore in the engagement part; typically the threaded bore will be parallel to the bore, which again is easy to manufacture. The head may act to hold the retained end captive in the bore.

The compressible washer may be formed from a resilient and in particular elastomeric material, such as polyurethane.

The pin may comprise a circumferential groove around its circumference, which can be engaged by a biased member in the power head.

This provides further redundancy in retaining the pin and provides a positive confirmation to the user that the pin is in the appropriate position when they can feel the biased member entering the groove.

The mounting of the engagement part may comprise a fixed portion in addition to the moveable portion, the fixed portion providing a fixed location for the power head. Typically, the fixed portion may comprise a slot for a pin of the power head.

Typically, the workpiece will comprise a hex head of a bolt or a hexagonal nut. As such, the engagement part may comprise a hex drive for driving hex bolts or nuts. The hex drive may be a ratchet hex drive, in that it can only turn in a single rotational sense, the rotational sense being optionally selectable by a user.

The power head may be a hydraulic power head.

According to a second aspect of the invention, we provide a tool comprising the engagement part of the first aspect of the invention, and a power head, the power head being engaged on the mounting such that the power head is able to provide the engagement part with motive force to move the workpiece.

The tool may be, for example, a hydraulic wrench; as such, the power head may be a hydraulic power head.

The power head may comprise a bore for the pin. The power head may further comprise a biasing member and a biased member, the biasing member tending to bias the biased member into engagement with the groove in the pin through a wall of the bore in the power head in the first position of the movable portion. Typically, the biased member would be held captive in the power head, typically by working in a further bore in the power head having an aperture into the bore in which the pin works, with a diameter of the aperture being less than a diameter of the biased member. Typically, the biased member would comprise a spherical member such as a ball bearing, and the biasing member would comprise a spring in the further bore.

According to a third aspect of the invention, there is provided a kit of components for forming into a tool, the kit comprising at least three components selected from the following group, at least one of each of the elements being chosen:

at least one engagement part of the first aspect of the invention; and at least one power head capable of engaging the mounting portion of each engagement part.

As such, this provides an interchangeable system of power heads and engagement part that can be used for difference uses (e.g. different sized workpieces, different force or power requirements).

There now follows, by way of example only, description of an embodiment of the invention, described with reference to the accompanying drawings, in which.

Figure 1:
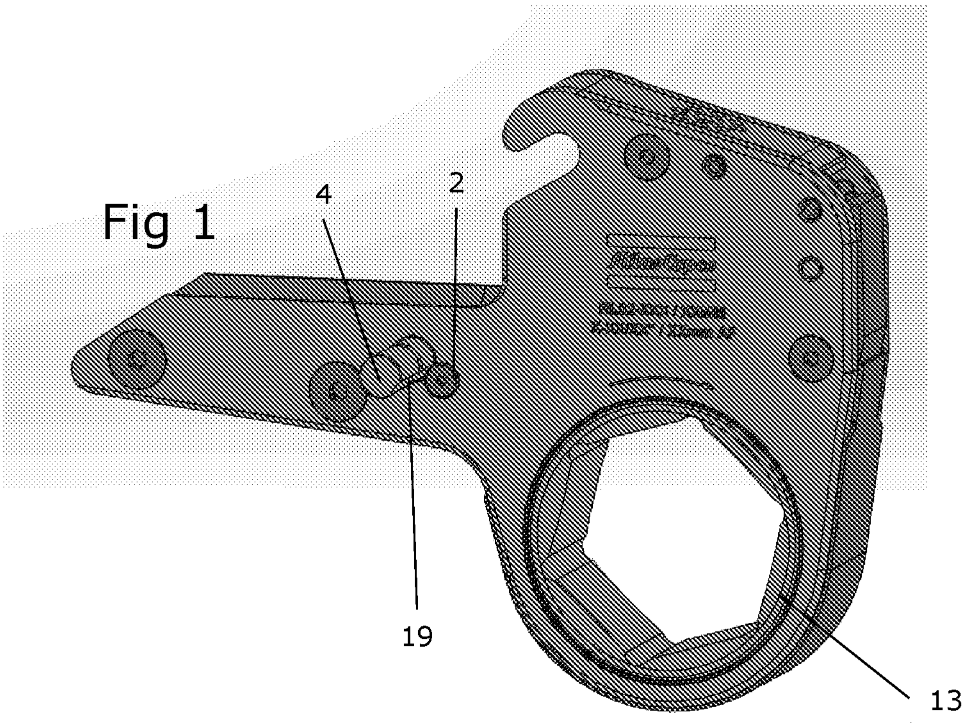
FIG. 1 shows a perspective view of a ratchet link of a hydraulic wrench in accordance with an embodiment of the invention.
Figure 2:
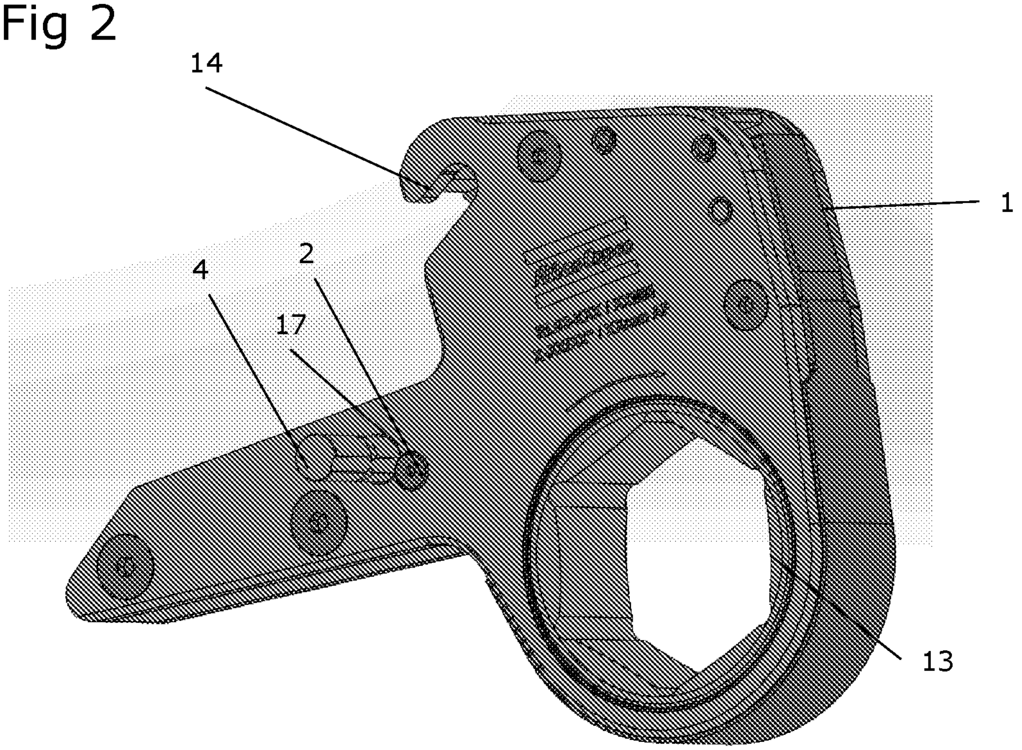
FIG. 2 shows a different perspective view of the ratchet link of FIG. 1.
Figure 3:
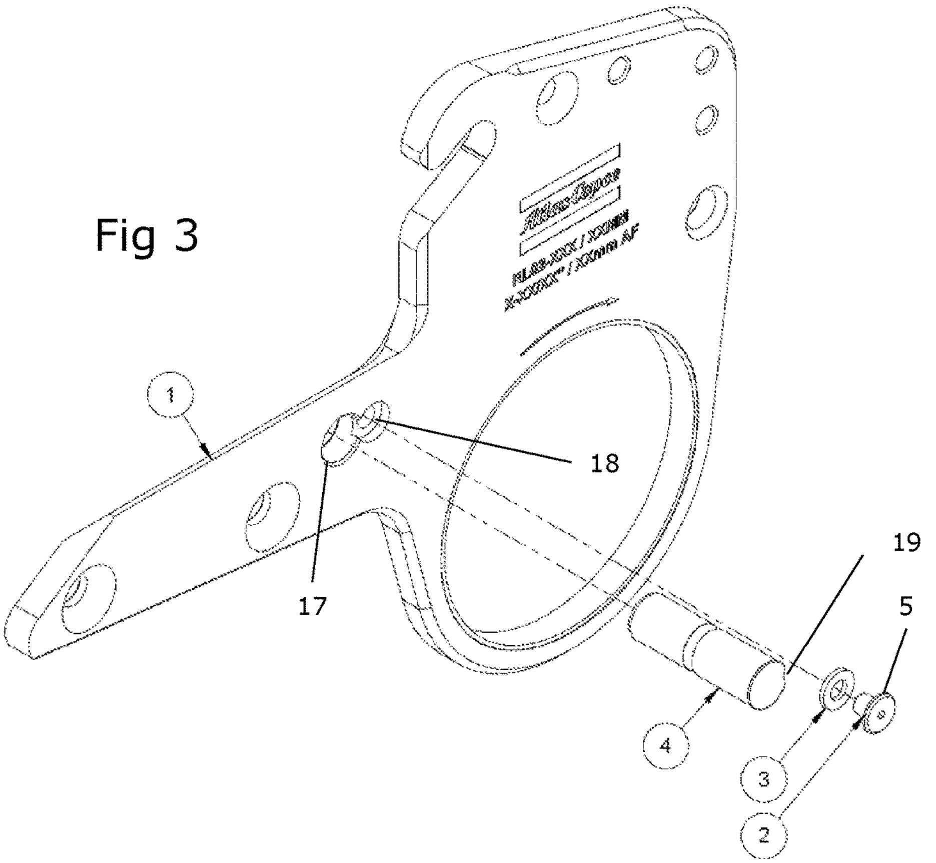
FIG. 3 shows a partial exploded perspective view of the ratchet link of FIG. 1.
Figure 4:
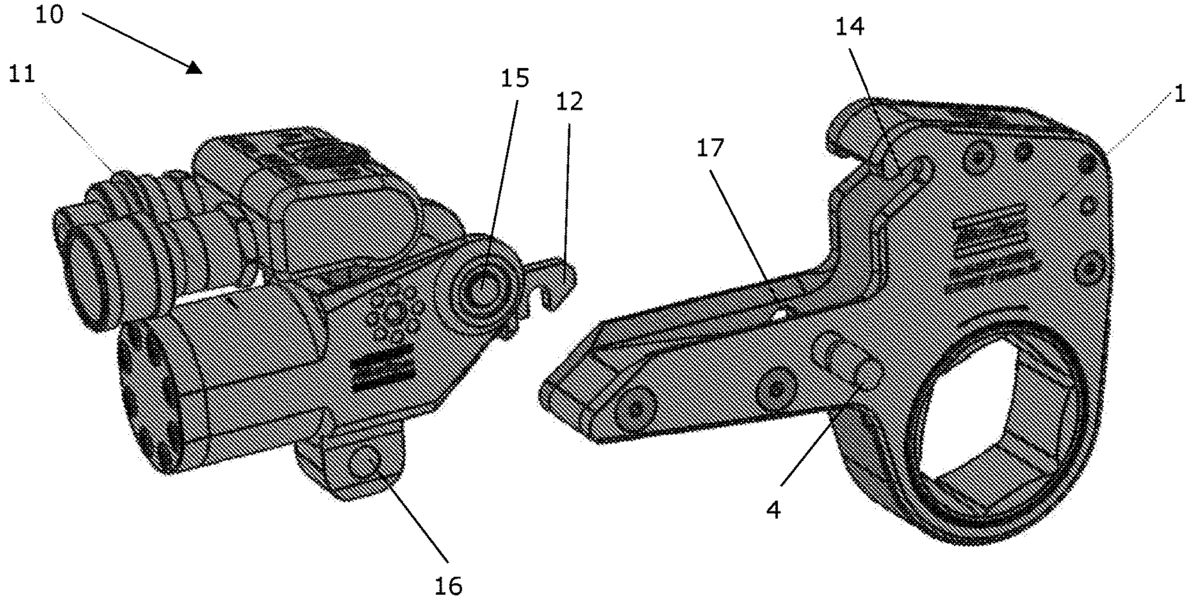
FIG. 4 shows a perspective view of the ratchet link of FIG. 1 in combination with a power head, so as to form a hydraulic wrench.
Figure 5:
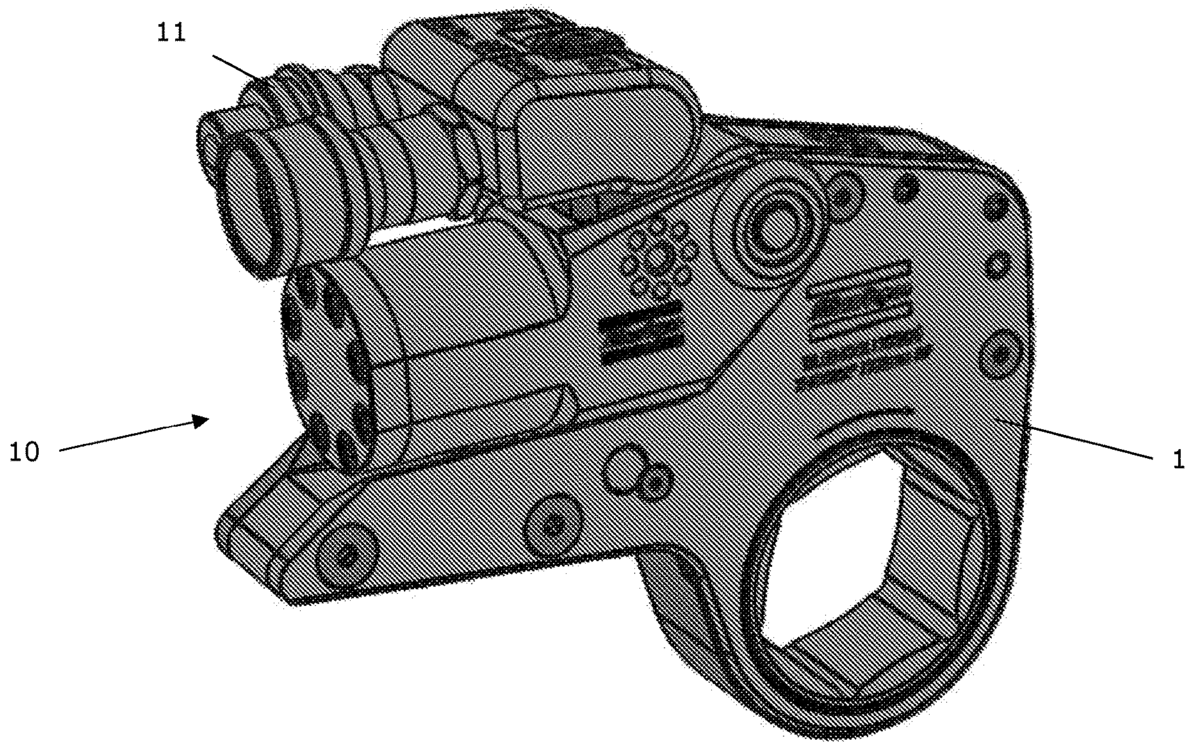
FIG. 5 shows a perspective view of the hydraulic wrench formed by the combination of the elements of FIG. 4.
Figure 6:
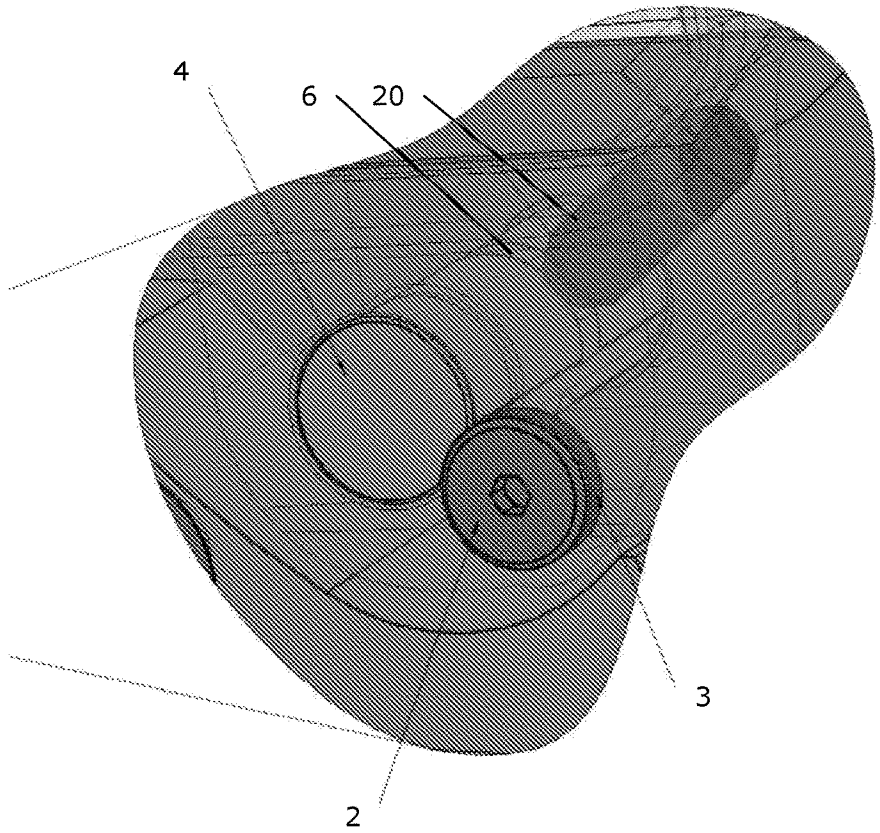
FIG. 6 shows a partially cut away perspective view of the hydraulic wrench of FIG. 5.

The accompanying drawings show a hydraulic wrench 10 that is formed of a ratchet link 1 (otherwise described above as an engagement part) to which is removably coupled a power head 11. The power head uses a hydraulic power source to generate motion of a piston rod end 12; this acts upon the ratchet link 1 and is used to rotate a hex drive 13, which can rotate a hexagonally shaped workpiece such as a hexagonal bolt head or nut.

In order to mount the power head 11 on the ratchet link 1 (both of which being capable of being attached to other such components, with different pairings of power heads and ratchet links being possible), a mounting is provided. This comprises a fixed slot 14 in the ratchet link 1 which receives a fixed pin 15 on the power head 11, and a sliding pin 4 working in a first bore 17 in the ratchet link 1 and which is received in a bore 16 on the power head 11.

As such, with the fixed pin 15 in slot 14, and the sliding pin 4 received within the bore 16, the power head 11 and ratchet link 1 are fixed together. To release those two parts, the sliding pin 4 is withdrawn from the bore 16 in the power head 11 and the power head can then be removed from the ratchet link 1.

It is desirable that some way of retaining the sliding pin 4, to ensure that it does not unexpectedly withdraw from the bore 16, and furthermore so that it does not fall out of the ratchet link 1 entirely. To that end, a friction lock is provided. This comprises a threaded screw 2 having a larger diameter head 5 and a compressible washer 3. The threaded screw 2 works in second, threaded bore 18 in the ratchet link 1 parallel to the first bore 17 (and therefore convenient to machine).

The cross section of the pin 4 is circular, but (apart from at end 21 as explained below) with a part-circular cutout 19 roughly coaxial with the second bore 18.

The friction lock acts on the cutout 19. The compressible washer 3 is made of a material which, when compressed by the screw 2 (and in particular the flange formed by the head 5 of the screw), expands, in particular radially outwards from the second bore 18. This means that if the user screws screw 2 into the second bore to its fullest extent, the compressible washer 3 will expand outwards as far as possible, engaging the pin 4 and preventing, or at least restricting, its withdrawal. If desired, the user could unscrew the screw 2, such that the compression on compressible washer 3 reduces, and its radial extent decreases. The pin 4 can then be free to be removed to allow for the removal of power head 11 from ratchet link 1. However, it is envisaged that the friction lock will provide frictional force such that the user could remove the pin against the frictional force generated by the friction lock, but unintentional removal or escaping will be inhibited.

Figure 7:
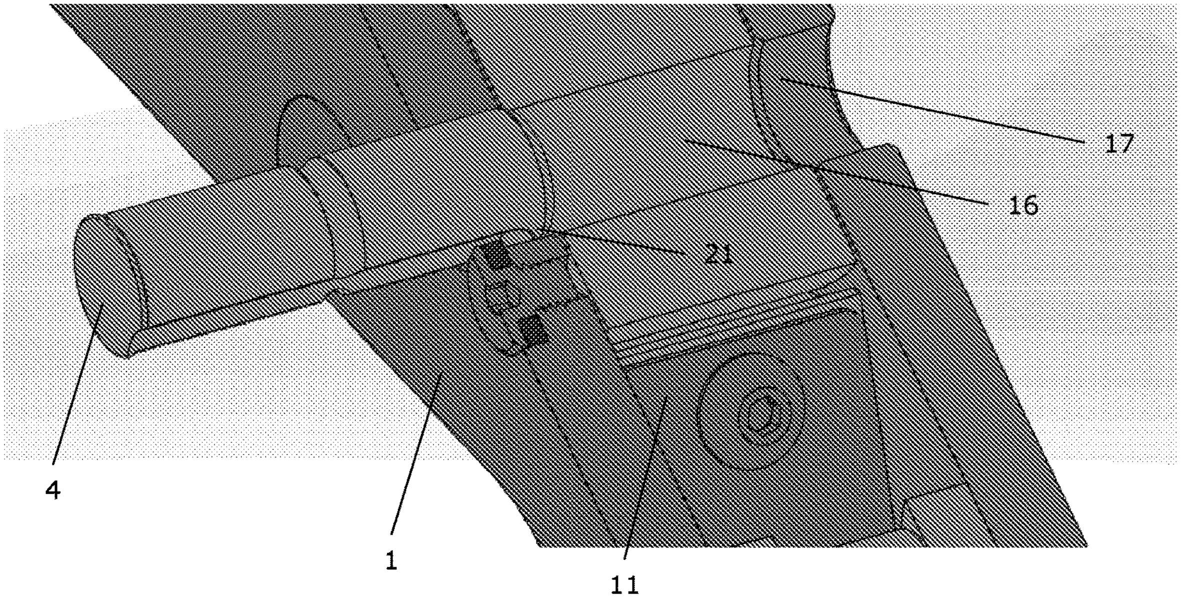
FIG. 7 shows a partial cross section through the hydraulic wrench of FIG. 5.

As can be seen in FIG. 7 of the accompanying drawings, the cutout 19 does not extend the entire length of the pin 4, and is not present at the end 21 retained in the ratchet link 1, where the pin 4 is entirely circular. As such, the pin 4 cannot pass the screw 2 and washer 3 with the screw in place. This prevents the pin 4 unintentionally dropping out.

The power head 11 is also provided with a spring-loaded ball 20 which works through an aperture in the bore 16 to be received within a groove 6 in the pin. This can assist with retaining the pin 4 in the power head 11 and ratchet link 1 and can provide a user with positive feedback that the pin has been inserted into the correct location, as it will be possible to feel the ball 20 engage the groove 6. However, this is merely a backup to the friction lock.

As such, by using this friction lock, the pin 4 can be prevented or restricted from sliding out in use; tool reliability is increased because the pin cannot (or is less likely) to disengage from the power head 11. The pin 4 is less likely to drop out and potentially form a drop hazard than, say, a prior art spring-loaded ball. Having the first and second bores parallel means that they are easy to machine.

The invention claimed is:

1. An engagement part of a tool, the engagement part being arranged to engage a workpiece and a power head, the engagement part being arranged to convert movement generated by the power head into movement of the workpiece, the engagement part comprising a mounting for the power head, the mounting comprising a moveable portion moveable from a first position where the power head is fixed relative to the engagement part and a second position where the power head can move relative to the engagement part, the moveable portion comprising a pin having a length and slidable along its length in a bore in the engagement part and a friction lock comprising a compressible member and a compressing member arranged to compress the compressible member, the compressible member being arranged such that it expands in at least one extent on compression by the compressing member such that in a locked position of the friction lock the compressible member extends so as contact the pin so as to restrict movement of the pin.

2. The engagement part of claim 1, in which the pin has a consistent non-circular cross section over a portion of its length, the portion typically being a majority of the length.

3. The engagement part of claim 2, in which the cross section has a circumference and comprises a first shape over a first portion of the circumference and a second shape over a second portion of the circumference, the first and second shapes being non-concentric circular arcs, with a centre of the arc forming the second shape being outside of the cross section.

4. The engagement part of claim 3, in which the compressible member is arranged to engage the pin at the second portion of the circumference.

5. The engagement part of claim 4, in which the compressible member has an outer circumference complementary to the second shape; the compressible member being circular, and having a variable radius depending on a degree of compression applied to the compressible member by the compression member, with the compressible member typically frictionally engaging the pin over the second shape in the locked position.

6. The engagement part of claim 5, in which the compressible member comprises a compressible washer, and the compression member comprises a threaded stud and a head, the head providing a flange which bears onto the compressible washer.

7. The engagement part of claim 6, in which the threaded stud is mounted in a threaded bore in the engagement part, with the threaded bore parallel to the bore.

8. The engagement part claim 2, in which the portion of the length does not extend to a retained end of the pin, which is held captive in the bore by at least the compressible member, and optionally the compression member.

9. The engagement part of claim 8, in which the retained end may have a cross section of the first shape.

10. The engagement part of claim 1, in which the mounting of the engagement part comprises a fixed portion, the fixed portion providing a fixed location for the power head.

11. A tool comprising an engagement part of a tool, the engagement part being arranged to engage a workpiece and a power head, the engagement part being arranged to convert movement generated by the power head into movement of the workpiece, the engagement part comprising a mounting for the power head, the mounting comprising a moveable portion moveable from a first position where the power head is fixed relative to the engagement part and a second position where the power head can move relative to the engagement part, the moveable portion comprising a pin having a length and slidable along its length in a bore in the engagement part and a friction lock comprising a compressible member and a compressing member arranged to compress the compressible member, the compressible member being arranged such that it expands in at least one extent on compression by the compressing member such that in a locked position of the friction lock the compressible member extends so as contact the pin so as to restrict movement of the pin, the tool further comprising and a power head, the power head being engaged on the mounting such that the power head is able to provide the engagement part with motive force to move the workpiece.

12. The tool of claim 11, in which the pin comprises a circumferential groove around its circumference and the power head comprises bore for the pin, a biasing member and a biased member, the biasing member tending to bias the biased member into engagement with the groove through a wall of the bore in the power head in the first position of the movable portion.

13. The tool of claim 12, in which the biased member is held captive in the power head by working in a further bore in the power head having an aperture into the bore in which the pin works, with a diameter of the aperture being less than a diameter of the biased member.

14. The tool of claim 11, being a hydraulic wrench.

15. A kit of components for forming into a tool, the kit comprising at least three components selected from the following group, at least one of each of the elements being chosen:

at least one engagement part being arranged to engage a workpiece and a power head, the engagement part being arranged to convert movement generated by the power head into movement of the workpiece, the engagement part comprising a mounting for the power head, the mounting comprising a moveable portion moveable from a first position where the power head is fixed relative to the engagement part and a second position where the power head can move relative to the engagement part, the moveable portion comprising a pin having a length and slidable along its length in a bore in the engagement part and a friction lock comprising a compressible member and a compressing member arranged to compress the compressible member, the compressible member being arranged such that it expands in at least one extent on compression by the compressing member such that in a locked position of the friction lock the compressible member extends so as contact the pin so as to restrict movement of the pin; and at least one power head capable of engaging the mounting portion of each engagement part.

* * * * *